US 8,842,618 B2

(12) United States Patent
Yu et al.

(10) Patent No.: US 8,842,618 B2
(45) Date of Patent: Sep. 23, 2014

(54) REVERSE POWER CONTROL METHODS BASED ON MULTI CARRIER

(75) Inventors: Xi Yu, Shenzhen (CN); Zhongshi Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 330 days.

(21) Appl. No.: 13/147,734

(22) PCT Filed: Dec. 22, 2009

(86) PCT No.: PCT/CN2009/075858
§ 371 (c)(1),
(2), (4) Date: Aug. 3, 2011

(87) PCT Pub. No.: WO2010/088831
PCT Pub. Date: Aug. 12, 2010

(65) Prior Publication Data
US 2011/0292899 A1 Dec. 1, 2011

(30) Foreign Application Priority Data
Feb. 6, 2009 (CN) .......................... 2009 1 0006244

(51) Int. Cl.
*H04B 7/216* (2006.01)
(52) U.S. Cl.
USPC .......................................... 370/329
(58) Field of Classification Search
None
See application file for complete search history.

(56) References Cited

U.S. PATENT DOCUMENTS

| 5,896,411 | A  | * | 4/1999  | Ali et al. ........................ 375/130 |
| 6,928,066 | B1 | * | 8/2005  | Moon et al. ................... 370/342 |
| 7,859,986 | B2 | * | 12/2010 | Laroia et al. .................. 370/208 |
| 8,223,875 | B2 | * | 7/2012  | Kotecha et al. ............... 375/267 |
| 8,374,146 | B2 | * | 2/2013  | Ratasuk et al. ............... 370/329 |
| 8,379,581 | B2 | * | 2/2013  | Imamura ....................... 370/329 |
| 2005/0243749 | A1 |   | 11/2005 | Mehrabanzad |
| 2007/0019589 | A1 | * | 1/2007  | Attar et al. .................... 370/335 |
| 2007/0115909 | A1 | * | 5/2007  | Wang et al. ................... 370/342 |

(Continued)

FOREIGN PATENT DOCUMENTS

| CN | 1700612 A | 11/2005 |
| CN | 1859057 A | 11/2006 |

(Continued)

OTHER PUBLICATIONS

P.R. China, State Intellectual Property Office, International Search Report for International Application No. PCT/CN2009/075858, date of mailing: Apr. 1, 2010.

(Continued)

*Primary Examiner* — Jay P Patel
(74) *Attorney, Agent, or Firm* — Bright IP Law Offices

(57) ABSTRACT

A reverse power control method based on multi-carrier includes: an access network determining a forward carrier for a service, establishing a corresponding relationship between a reverse carrier corresponding to the forward carrier and the forward carrier, and transmitting the forward carrier and the corresponding relationship to the terminal (S102); the access network determining a power control command of the service according to a service type of the service (S104); the access network transmitting the power control command of the service to the terminal by the forward carrier (S106). The present invention can reduce the power consumption of the terminal efficiently and improve the QoS.

19 Claims, 3 Drawing Sheets

(56) References Cited

U.S. PATENT DOCUMENTS

| | | | |
|---|---|---|---|
| 2007/0230404 A1* | 10/2007 | Song | 370/335 |
| 2008/0032633 A1* | 2/2008 | Harrison et al. | 455/69 |
| 2008/0112383 A1* | 5/2008 | Li | 370/342 |
| 2008/0159248 A1* | 7/2008 | Li | 370/342 |
| 2008/0198813 A1* | 8/2008 | Lu | 370/335 |
| 2008/0268864 A1* | 10/2008 | Andersson et al. | 455/453 |
| 2009/0103508 A1* | 4/2009 | Lomp et al. | 370/342 |
| 2010/0039997 A1* | 2/2010 | Ratasuk et al. | 370/329 |
| 2010/0067470 A1* | 3/2010 | Damnjanovic et al. | 370/329 |
| 2010/0142455 A1* | 6/2010 | Imamura | 370/329 |
| 2010/0290404 A1* | 11/2010 | Nishio | 370/328 |
| 2011/0085485 A1* | 4/2011 | Yoon et al. | 370/311 |
| 2011/0194571 A1* | 8/2011 | Ozluturk et al. | 370/479 |
| 2011/0206000 A1* | 8/2011 | Kwon et al. | 370/330 |
| 2011/0243087 A1* | 10/2011 | Ahn et al. | 370/329 |
| 2013/0163549 A1* | 6/2013 | Montojo et al. | 370/329 |

FOREIGN PATENT DOCUMENTS

| | | |
|---|---|---|
| CN | 1949676 A | 4/2007 |
| CN | 101023597 A | 8/2007 |
| CN | 101288243 A | 10/2008 |
| CN | 101483909 A | 7/2009 |
| EP | 1367739 A1 | 12/2003 |

OTHER PUBLICATIONS

P.R. China, State Intellectual Property Office, Office Action for CN App. No. 200910006244.X, dated Apr. 6, 2010.

\* cited by examiner

REVERSE POWER CONTROL METHODS BASED ON MULTI CARRIER

CROSS REFERENCE TO RELATED APPLICATION

This application claims priority to PCT Application No. PCT/CN2009/075858, filed on Dec. 22, 2009, entitled "Reverse Power Control Method Based on Multi-Carrier," which is hereby incorporated by reference in its entirety.

FIELD OF THE INVENTION

The present invention relates to the communication field, and in particular to reverse power control methods based on multi-carrier.

BACKGROUND OF THE INVENTION

In a wireless communication system, different services have different demands on Quality of Service (QoS), and the services can be classified into different categories according to the demands of the service on the QoS. For example, the services can be categorized into a Best Effort (BE) stream, an Assured Forwarding (AF) stream, and an Expedited Forwarding (EF) stream, in which the AF stream and the EF stream are jointly called as QoS streams.

In the above, the BE stream is able to stand a relatively higher end-to-end delay and has a low demand on Bit Error Rate (BER). For example, both File Transfer Protocol (FTP) (also called as File Download) and HyperText Transport Protocol (HTTP) (also called as Web Page Browsing) are BE streams.

The AF stream (e.g., a video stream generated from a video conference), similar to the BE stream, is able to stand a relatively higher end-to-end delay, but it has relatively high demands on the BER and minimum average throughput.

The EF stream has a relatively lower demand on the throughput, but has relatively higher demand on the end-to-end delay. For example, both a Voice over Internet Protocol (VoIP) service and a Video Telephone (VT) service are EF streams.

At present, multi-carrier technology is mainly used in a DOREVB system. When a subscriber requests multiple services simultaneously, the network side will assign a carrier for each of the QoS services; that is, bearing each of the QoS services on a single carrier, and use a same power control strategy to each of the services. Since different power control strategies are adopted for different services, if the network side still uses the same power control strategy for each of the services when the types of the requested multiple services are different, especially when QoS services and non-QoS services coexist, a waste of terminal resources will occur and the QoS will be affected.

SUMMARY OF THE INVENTION

The present invention is proposed considering the technical problem in the related art that network side uses a same power control strategy for multiple services requested by a subscriber, which results in a waste of terminal resources and affects QoS. Therefore, the main object of the present invention is to provide reverse power control methods and device based on multi-carrier to solve the above problem.

According to one aspect of the present invention, a reverse power control method based on multi-carrier is provided which is used to perform, by an access network, power control on multiple services requested by a terminal.

The reverse power control method based on multi-carrier according to the present invention comprises: the access network determining a forward carrier for a service, establishing a corresponding relationship between a reverse carrier corresponding to the forward carrier and the forward carrier, and transmitting the forward carrier and the corresponding relationship to the terminal; the access network determining a power control command of the service according to a service type of the service; and the access network transmitting the power control command of the service to the terminal by the forward carrier.

In the above, before the access network determines the forward carrier for the service, the method may also comprise: the terminal transmitting an access request to the access network, so as to request for establishing a forward service channel of the service, wherein the access request carries information of the service type of the service; and the access network establishing the forward service channel of the service according to the access request, wherein the forward service channel is borne on the forward carrier.

In the above, the process of the access network transmitting the power control command of the service to the terminal by the forward carrier may comprise: the access network transmitting the power control command of the service to the terminal via the forward service channel borne on the forward carrier.

Moreover, in this method, the process of determining the power control command may comprise: determining the power control command according to a power control strategy and/or a power control parameter.

Preferably, after the access network transmits the power control command of the service to the terminal, the method may also comprise: the terminal determining the reverse carrier corresponding to the forward carrier according to the forward carrier and the corresponding relationship; and the terminal adjusting pilot power of a reverse service channel of the service on the reverse carrier by using the power control command.

According to another aspect of the present invention, a reverse power control method based on multi-carrier is provided, which is used to perform, by an access network, a power control on multiple services requested by a terminal.

The reverse power control method based on multi-carrier according to the present invention comprises: for each service, the access network determining a power control command of the service according to a service type of the service; the terminal determining a reverse carrier of the service, establishing a corresponding relationship between the reverse carrier and a forward carrier corresponding to the reverse carrier, and transmitting the reverse carrier and the corresponding relationship to the access network; and the access network determining the forward carrier corresponding to the reverse carrier according to the reverse carrier and the corresponding relationship, and transmitting the power control command of the service to the terminal via the forward carrier.

In the above, before the access network transmits the power control command of the service to the terminal via the forward carrier, the method may also comprise: the terminal transmitting an access request to the access network, so as to request for establishing a forward service channel of the service, wherein the access request carries information of the service type of the service; and the access network establishing the forward service channel of the service according to the access request, wherein the forward service channel is borne on the forward carrier.

Furthermore, the process of the access network transmitting the power control command of the service to the terminal via the forward carrier may comprise: the access network transmitting the power control command of the service to the terminal via the forward service cannel borne on the forward carrier.

In addition, the process of determining the power control command may comprise: determining the power control command according to a power control strategy and/or a power control parameter.

Preferably, after the access network transmits the power control command of the service to the terminal, the method may also comprise: the terminal adjusting pilot power of a reverse service channel of the service on the reverse carrier by using the power control command.

Preferably, in the method, the terminal may notify the access network of the reverse carrier and the corresponding relationship via one of the following messages: a service channel establishment completion response message, and a negotiation message.

By means of at least one of the above technical solutions of the present invention, compared with the prior art, the power consumption of the terminal can be reduced efficiently, and the QoS can be improved, by determining the forward carrier and the reverse carrier corresponding to each of the services and using the power strategy corresponding to each of the service.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

Figure 1:
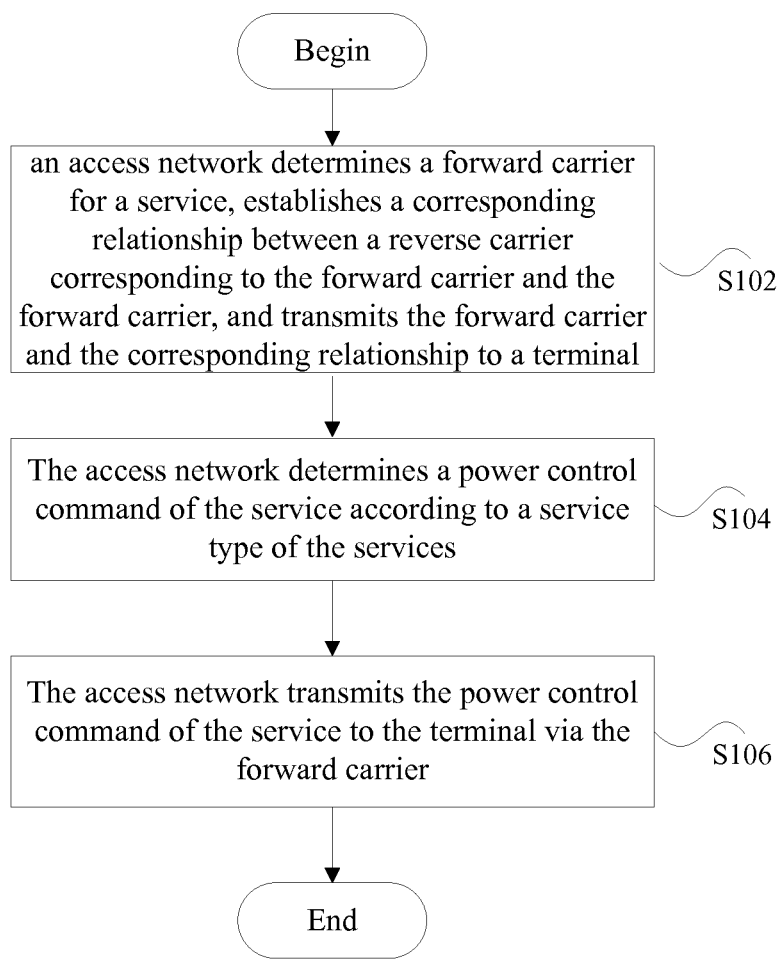
FIG. 1 is a flow chart of a reverse power control method based on multi-carrier according to Method Embodiment 1 of the present invention.

As described above, at present, in a network system using multi-carrier technology, when a subscriber requests multiple services including a QoS service at the same time, the network side will assign one carrier for each QoS service, and use a same power control strategy for each service, which will result in a waste of terminal resources. Regarding this problem, the present invention provides a reverse power control solution based on multi-carrier which uses different power control strategies for the carriers bearing different services.

In the embodiments of the present invention, for each QoS service, either the Access Network (AN) or an Access Terminal (as AT) (i.e., the above-mentioned terminal) determines a first reference carrier bearing the QoS service, and determines a corresponding relationship between the first reference carrier and a second reference carrier, wherein this first reference carrier and the second reference carrier are the forward/reverse carrier of each other respectively; the access network or the terminal notifies each other of the first reference carrier and the corresponding relationship, and then the access network transmits a power control command of the service to the terminal via a forward service channel borne on the forward carrier; and the terminal adjusts, on the reverse carrier corresponding to the forward carrier, pilot power of a reverse service channel of the service by using the received power control command.

The embodiments of the present invention and the features thereof can combine with each other if there is no conflict.

The methods used in the prior art will be described by taking an example before illustrating the embodiments of the present invention, for the convenience of understanding the embodiments of the present invention. For example, in a multi-carrier network system, when a subscriber requests a VT service and a FTP service simultaneously to the network side, the network side will bear the VT service on one carrier and the FTP service on another carrier, and transmits a same power control strategy to the VT service and the FTP service so as to make the VT service and the FTP service adjust pilot power of the reverse service channel of their own by using the received power control strategy. However, since the VT service belongs to an EF stream and the FTP service belongs to a BE stream, their service types are different; moreover, the VT service has higher demand for the QoS than the FTP service, if the same power control strategy is used for the reverse carrier bearing the VT service and the reverse carrier bearing the download service, power of the terminal will be wasted and QoS of the QoS service will be affected.

The detailed descriptions of the embodiments of the present invention will be described in details in conjunction with the drawings hereinafter. During the specific realization process, two methods can be used to implement the reverse power control methods based on multi-carrier of the present invention. The two methods will be illustrated respectively in combination with Method Embodiment One and Method Embodiment Two hereinafter.

Method Embodiment 1

A reverse power control method based on multi-carrier is provided according to the embodiments of the present invention.

FIG. 1 is a flow chart of the reverse power control method based on multi-carrier according to the embodiments of the present invention. It should be noted that, for the convenience of description, the technical solution of the method embodiments of the present invention is shown and described in FIG. 1 in a form of steps, and the steps shown in FIG. 1 can be executed in a computer system such as a group of instruments executed by the computers. Although a logic sequence is shown in FIG. 1, under some circumstances, the steps shown or described can be executed in a sequence different from the sequence shown here. As shown in FIG. 1, the method comprises the following steps (Step S102 to Step 106).

Step S102: For each service requested by a subscriber, an access network determines a forward carrier for the service, establishes a corresponding relationship between a reverse carrier corresponding to the forward carrier and the forward carrier, and transmits the forward carrier and the corresponding relationship to a terminal.

Step S104: The access network determines a power control command of the service according to a service type of the services, wherein the access work can determine the power control command according to a power control strategy and/or a power control parameter, and generate the power control command (the power control command can be a string of bits) after making the determination.

Step S106: The access network transmits the power control command of the service to the terminal via the forward carrier; afterwards, the terminal determines the reverse carrier corresponding to the forward carrier according to the forward carrier and the corresponding relationship, and adjusts, on the reverse carrier, pilot power of a reverse service channel of the service by using the power control command.

In the above, the power control strategy may be pre-set in the system and identified in a unified way, and each power control strategy can be indicated by a power control parameter.

By means of the technical solution provided by the embodiments of the present invention, the access network determines the forward carrier and the reverse carrier corresponding to each service, and notifies, on the forward carrier, the terminal of the power control command, so that the terminal can adjust, on the corresponding reverse carrier, the pilot power of the reverse service channel of the service, therefore power consumption of the terminal is reduced efficiently and QoS is improved.

During specific application process, the subscriber may transmit an access request to the access network when requesting simultaneously the multiple services to the access network, wherein the access request carries information of the service type of the multiple services and requests for establishing the forward service channel of each service; and the access network specifies, according to the access request, the forward carrier and the reverse carrier corresponding to the forward carrier for each service, and establishes different forward service channels for different services. The embodiments of the present invention will be illustrated by taking Service 1 as an example in order to describe the embodiments clearly.

The access network specifies a forward carrier for Service 1, establishes a corresponding relationship between the forward carrier and a reverse carrier corresponding to the forward carrier, and transmits the forward carrier and the corresponding relationship to a terminal via a control channel; and the access network determines, according to information of the service type of Service 1 in an access request, a power control strategy and/or a power control parameter of Service 1, generates a power control command, establishes a forward service channel on the specific forward carrier assigned for Service 1, and transmits the power control command to the terminal via the forward service channel.

Accordingly, the terminal receives the forward carrier and the corresponding relationship of Service 1 on the control channel, parses, via the forward carrier and the corresponding relationship, the reverse carrier corresponding to the forward carrier, and receives the power control command of Service 1 on the forward service channel borne on the forward carrier. Afterwards, the terminal adjusts, on the parsed reverse carrier, pilot power of a reverse service channel of Service 1 by using the received power control command.

In this way, by the method provided by the embodiments of the present invention, the terminal can use different power control strategies according to different services borne on different carriers, and adjust the pilot power of the reverse service channel of each service.

Method Embodiment 2

A reverse power control method based on multi-carrier is provided according to the embodiments of the present invention.

Figure 2:
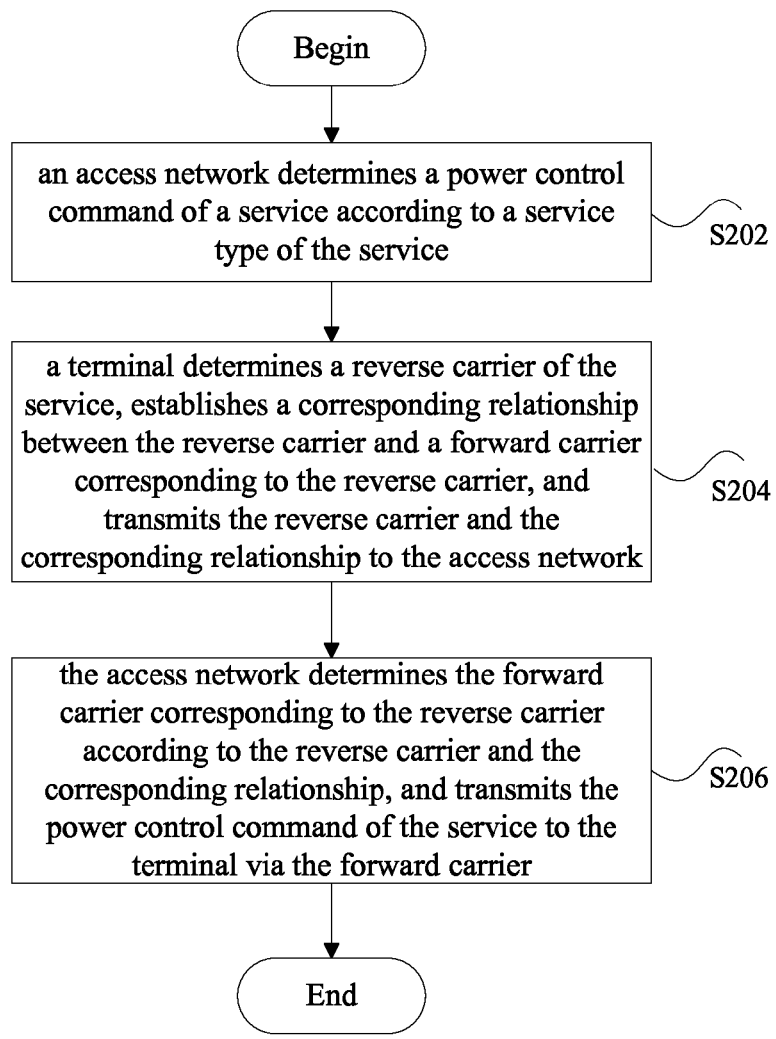
FIG. 2 is a flow chart of a reverse power control method based on multi-carrier according to Method Embodiment 2 of the present invention.

FIG. 2 is a flow chart of the reverse power control method based on multi-carrier according to the embodiments of the present invention. As shown in FIG. 2, the following operations (Step S202 to Step 206) are comprised.

Step S202: For each service requested by a subscriber, an access network determines a power control command of the service according to a service type of the service, wherein the access network can determine the power control command according to a power control strategy and/or a power control parameter, and generates the power control command (the power control command can be a string of bits) after making the determination.

Step 204: A terminal determines a reverse carrier of the service, establishes a corresponding relationship between the reverse carrier and a forward carrier corresponding to the reverse carrier, and transmits the reverse carrier and the corresponding relationship to the access network.

Step S206: The access network determines the forward carrier corresponding to the reverse carrier according to the reverse carrier and the corresponding relationship, and transmits the power control command of the service to the terminal via the forward carrier; and the terminal adjusts, on the reverse carrier, pilot power of a reverse service channel of the service by using the power control command.

In the above, the power control strategy can be pre-set in the system and identified in a unified way, and each power control strategy can be indicated by the power control parameter.

By means of the technical solution provided by the embodiments of the present invention, the terminal determines the forward carrier and the reverse carrier corresponding to each service, and the access network notifies, on the forward carrier, the terminal of the power strategy used by each service, so that the terminal can adjust, on the corresponding reverse carrier, the pilot power of the reverse service channel of the service, therefore power consumption of the terminal is reduced efficiently and QoS is improved.

During the specific application process, the subscriber may transmit an access request to the access network when requesting the multiple services simultaneously to the access network, wherein this access request carries information of the service type of the multiple services and requests for establishing the forward service channel of each service. To describe clearly, the embodiments of the present invention will be illustrated by taking Service 1 as an example.

The access network determines a power control strategy and/or a power control parameter of Service 1 according to information of the service type of Service 1 in an access request, and generates a power control command thereof; the terminal determines a reverse carrier for Service 1, establishes a corresponding relationship between the reverse carrier and a forward carrier corresponding to the reverse carrier, and transmits the reverse carrier and the corresponding relationship to the access network via a service channel, specifically, the terminal can notify the access network of the reverse carrier and the corresponding relationship via one of the following messages: a service channel establishment completion response message, and a negotiation message; and the access network determines the forward carrier corresponding to the reverse carrier according to the reverse carrier and the corresponding relationship, establishes a forward service channel on the forward carrier, and transmits the power control command to the terminal via the forward service channel.

Accordingly, the terminal receives the power control command of Service 1 on the forward service channel borne on the forward carrier; and afterwards, the terminal adjusts, on the specified reverse carrier, pilot power of a reverse service channel of Service 1 by using the received power control command.

In this way, by the method provided by the embodiments of the present invention, the terminal can use different power control strategies according to different services borne on different carriers, and adjust the pilot power of the reverse service channel of each service.

Figure 3:
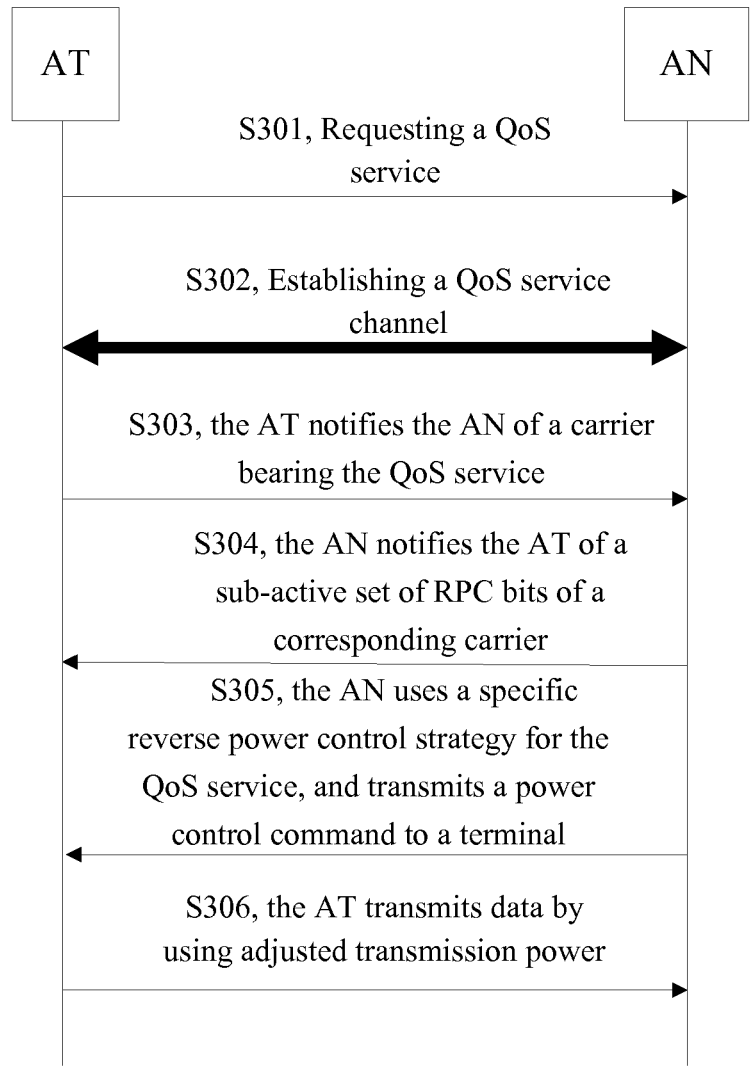
FIG. 3 is a detailed flow chart of the process of the reverse power control method based on multi-carrier according to Method Embodiment 2 of the present invention.

FIG. 3 describes a flow of an AT notifying, via a message, an AN of a carrier bearing a QoS service according to the embodiments of the present invention. As shown in FIG. 3, the following processing steps (Step S301 to Step S306) are comprised.

Step S301: An AT transmits to an AN a QoS service request when having a QoS service demand, so as to request for establishing a service channel, wherein the QoS service request carries information of the service type of each service.

Step S302: The AN determines that a QoS service channel can be established (i.e., the above-mentioned forward service channel) with the AT according to current resources of a system, and establishes the QoS service channel between the AN and the AT on a forward carrier.

Step S303: After the AT and the AN complete the establishment of the QoS service channel, the AT specifies, for each service respectively, a corresponding relationship between a reverse carrier and the forward carrier corresponding to the reverse carrier, and notifies the AN of the reverse carrier bearing each service and the related corresponding relationship.

Step S304: The AN determines the forward carrier corresponding to the reverse carrier according to the reverse carrier and the corresponding relationship.

Step S305: The AN transmits a power control command to a terminal via the forward carrier, uses a specific reverse power control strategy for the QoS service borne in the AT, and determines whether to enhance or lessen power control of a corresponding carrier of the AT.

Step S306: The AT performs power control on the reverse carrier corresponding to the forward carrier according to the power control command obtained on the forward carrier, i.e., adjusting, on the reverse carrier, pilot power of a reverse service channel of the service by using the received power control command.

As illustrated above, by means of the reverse power control method based on multi-carrier provided in the embodiments of the present invention, compared with the prior art, the power consumption of the terminal can be reduced efficiently, and the QoS can be improved, by determining the forward carrier and the reverse carrier corresponding to each of the services and using the power strategy corresponding to each of the service.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A reverse power control method based on multi-carrier, which is used to perform, by an access network, power control on multiple services requested by a terminal, for each service, the method comprising:

the access network determining a forward carrier for the service, establishing a corresponding relationship between a reverse carrier corresponding to the forward carrier and the forward carrier, and transmitting the forward carrier and the corresponding relationship to the terminal;

the access network determining a power control command of the service according to a service type of the service, wherein different types of services borne on different carriers correspond to different power control commands; and the access network transmitting the power control command of the service to the terminal by the forward carrier; wherein, before the access network determines the forward carrier for the service, the method further comprises:

the terminal transmitting an access request to the access network, so as to request for establishing a forward service channel of the service, wherein the access request carries information of the service type of the service; and the access network establishing the forward service channel of the service according to the access request, wherein the forward service channel is borne on the forward carrier.

2. The method according to claim 1, wherein the step of the access network transmitting the power control command of the service to the terminal by the forward carrier comprises:

the access network transmitting the power control command of the service to the terminal via the forward service channel borne on the forward carrier.

3. The method according to claim 2, wherein, after the access network transmits the power control command of the service to the terminal, the method further comprises:

the terminal determining the reverse carrier corresponding to the forward carrier according to the forward carrier and the corresponding relationship; and the terminal adjusting pilot power of a reverse service channel of the service on the reverse carrier by using the power control command.

4. The method according to claim 1, wherein the process of determining the power control command comprises:

determining the power control command according to a power control strategy and/or a power control parameter.

5. The method according to claim 4, wherein, after the access network transmits the power control command of the service to the terminal, the method further comprises:

the terminal determining the reverse carrier corresponding to the forward carrier according to the forward carrier and the corresponding relationship; and the terminal adjusting pilot power of a reverse service channel of the service on the reverse carrier by using the power control command.

6. The method according to claim 1, wherein, after the access network transmits the power control command of the service to the terminal, the method further comprises:

the terminal determining the reverse carrier corresponding to the forward carrier according to the forward carrier and the corresponding relationship; and the terminal adjusting pilot power of a reverse service channel of the service on the reverse carrier by using the power control command.

7. The method according to claim 1, wherein, after the access network transmits the power control command of the service to the terminal, the method further comprises:

the terminal determining the reverse carrier corresponding to the forward carrier according to the forward carrier and the corresponding relationship; and the terminal adjusting pilot power of a reverse service channel of the service on the reverse carrier by using the power control command.

8. A reverse power control method based on multi-carrier, which is used to perform, by an access network, a power control on multiple services requested by a terminal, for each service, the method comprising:
the access network determining a power control command of the service according to a service type of the service, wherein different types of services borne on different carriers correspond to different power control commands;
the terminal determining a reverse carrier of the service, establishing a corresponding relationship between the reverse carrier and a forward carrier corresponding to the reverse carrier, and transmitting the reverse carrier and the corresponding relationship to the access network; and
the access network determining the forward carrier corresponding to the reverse carrier according to the reverse carrier and the corresponding relationship, and transmitting the power control command of the service to the terminal via the forward carrier.

9. The method according to claim 8, wherein, before the access network transmits the power control command of the service to the terminal via the forward carrier, the method further comprises:
the terminal transmitting an access request to the access network, so as to request for establishing a forward service channel of the service, wherein the access request carries information of the service type of the service; and
the access network establishing the forward service channel of the service according to the access request, wherein the forward service channel is borne on the forward carrier.

10. The method according to claim 9, wherein after the access network transmits the power control command of the service to the terminal, the method further comprises:
the terminal adjusting pilot power of a reverse service channel of the service on the reverse carrier by using the power control command.

11. The method according to claim 9, wherein the terminal notifies the access network of the reverse carrier and the corresponding relationship via one of the following messages: a service channel establishment completion response message, and a negotiation message.

12. The method according to claim 9, wherein the step of the access network transmitting the power control command of the service to the terminal via the forward carrier comprises:
the access network transmitting the power control command of the service to the terminal via the forward service cannel borne on the forward carrier.

13. The method according to claim 12, wherein after the access network transmits the power control command of the service to the terminal, the method further comprises:
the terminal adjusting pilot power of a reverse service channel of the service on the reverse carrier by using the power control command.

14. The method according to claim 12, wherein the terminal notifies the access network of the reverse carrier and the corresponding relationship via one of the following messages: a service channel establishment completion response message, and a negotiation message.

15. The method according to claim 8, wherein the process of determining the power control command comprises:
determining the power control command according to a power control strategy and/or a power control parameter.

16. The method according to claim 15, wherein after the access network transmits the power control command of the service to the terminal, the method further comprises:
the terminal adjusting pilot power of a reverse service channel of the service on the reverse carrier by using the power control command.

17. The method according to claim 15, wherein the terminal notifies the access network of the reverse carrier and the corresponding relationship via one of the following messages: a service channel establishment completion response message, and a negotiation message.

18. The method according to claim 8, wherein after the access network transmits the power control command of the service to the terminal, the method further comprises:
the terminal adjusting pilot power of a reverse service channel of the service on the reverse carrier by using the power control command.

19. The method according to claim 8, wherein the terminal notifies the access network of the reverse carrier and the corresponding relationship via one of the following messages: a service channel establishment completion response message, and a negotiation message.

* * * * *